US009239233B2

(12) United States Patent
Nobutani

(10) Patent No.: US 9,239,233 B2
(45) Date of Patent: Jan. 19, 2016

(54) PROJECTION CONTROL APPARATUS AND PROJECTION CONTROL METHOD

(75) Inventor: Toshiyuki Nobutani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 13/568,196

(22) Filed: Aug. 7, 2012

(65) Prior Publication Data
US 2013/0050590 A1 Feb. 28, 2013

(30) Foreign Application Priority Data

Aug. 26, 2011 (JP) ................................. 2011-185252

(51) Int. Cl.
*G03B 21/00* (2006.01)
*G01B 11/25* (2006.01)
*H04N 9/31* (2006.01)

(52) U.S. Cl.
CPC .............. *G01B 11/25* (2013.01); *H04N 9/3179* (2013.01); *H04N 9/3194* (2013.01)

(58) Field of Classification Search
CPC ....... H04N 5/7416; H04N 9/31; G01B 11/25; G03B 21/00; G09G 5/00
USPC ....................................................... 348/450
See application file for complete search history.

(56) References Cited

U.S. PATENT DOCUMENTS

| 5,613,103 | A | 3/1997 | Nobutani et al. |
| 5,736,981 | A | 4/1998 | Nobutani et al. |
| 5,838,291 | A | 11/1998 | Ohshima et al. |
| 5,926,159 | A | 7/1999 | Matsuzaki et al. |
| 6,140,996 | A | 10/2000 | Nobutani et al. |
| 6,157,359 | A | 12/2000 | Shimakura et al. |
| 2006/0098168 | A1* | 5/2006 | McDowall et al. ............. 353/70 |
| 2008/0180373 | A1* | 7/2008 | Mori ............................... 345/89 |
| 2009/0295783 | A1* | 12/2009 | Baba et al. .................... 345/213 |
| 2011/0213664 | A1* | 9/2011 | Osterhout et al. ......... 705/14.58 |

FOREIGN PATENT DOCUMENTS

| JP | 11-038506 A | 2/1999 |
| JP | 2002-189458 A | 7/2002 |
| JP | 2008-076611 A | 4/2008 |

* cited by examiner

*Primary Examiner* — Sultan Chowdhury
*Assistant Examiner* — Dannell L Owens
(74) *Attorney, Agent, or Firm* — Fitzpatrick, Cella, Harper & Scinto

(57) ABSTRACT

A projection control apparatus for controlling a projection apparatus is configured to: receive a video signal including a plurality of color components; extract, as control information, information of a specific color component for each frame of the received video signal; generate, frame by frame, projection control information for controlling operation of the projection apparatus based on the extracted control information; and provide the generated projection control information to the projection apparatus.

10 Claims, 14 Drawing Sheets

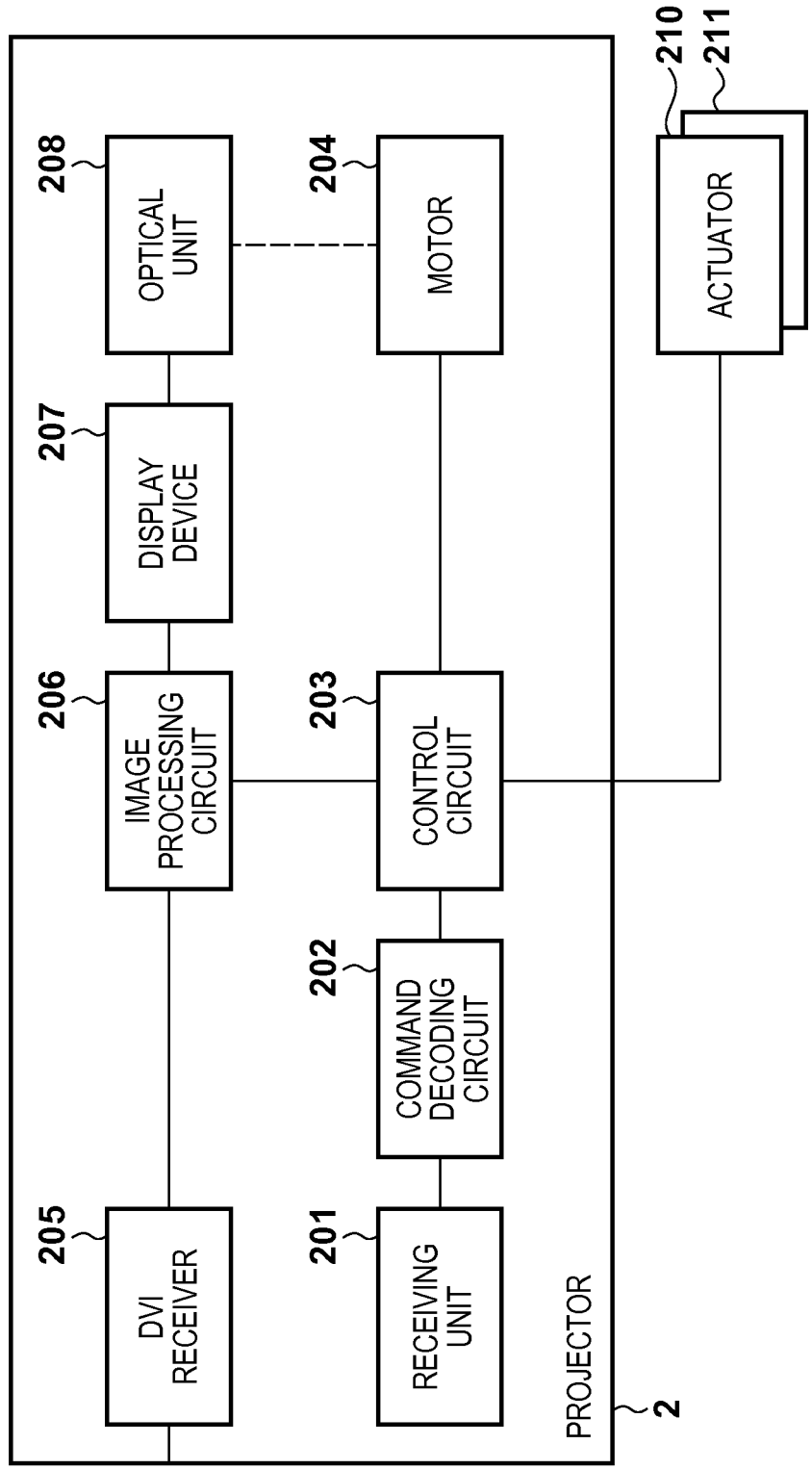

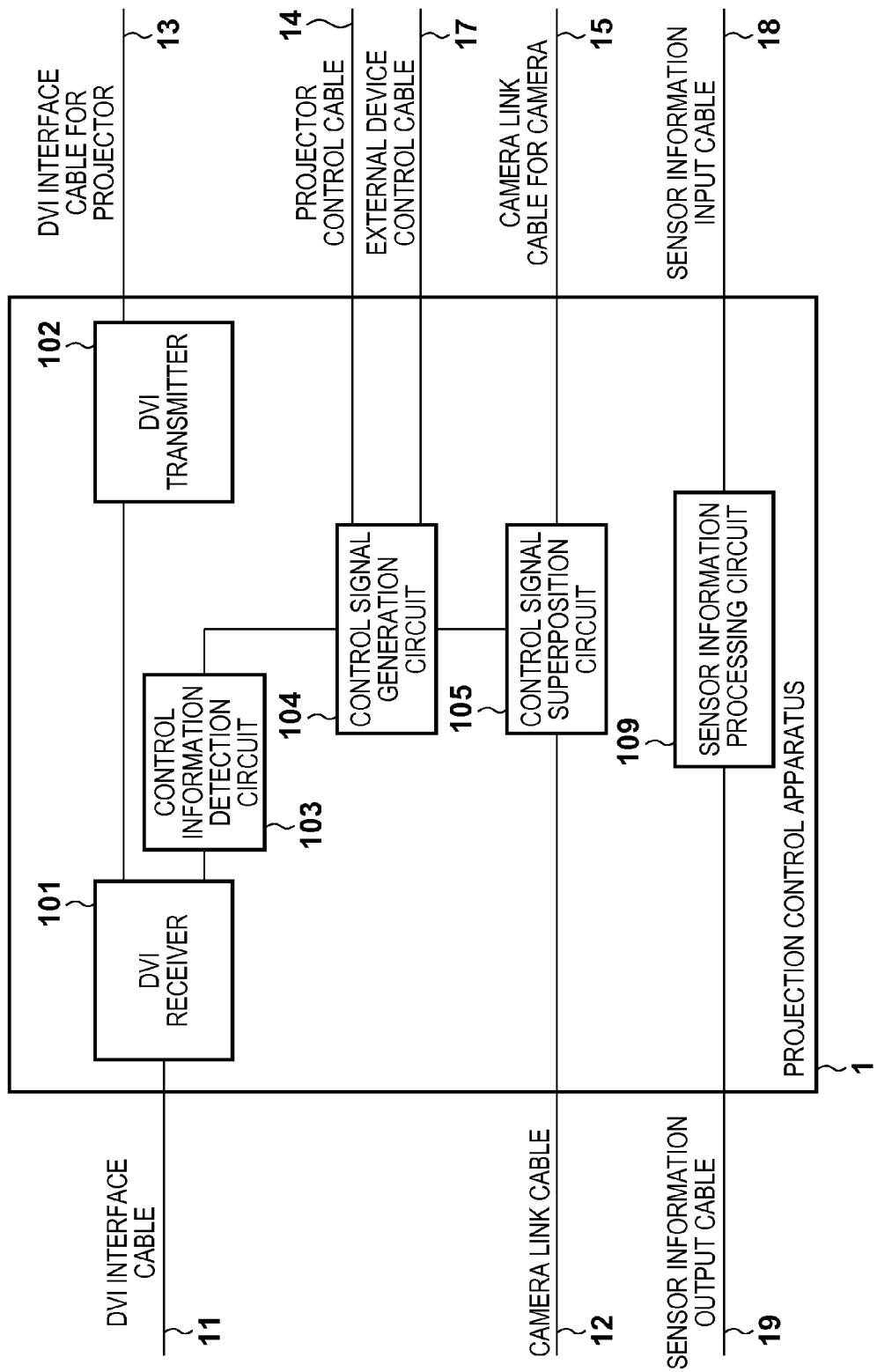

PROJECTION CONTROL APPARATUS AND PROJECTION CONTROL METHOD

BACKGROUND OF THE INVENTION

1. Field of the Invention

The present invention relates to a projection control apparatus and a projection control method for controlling a projection apparatus.

2. Description of the Related Art

An example of a general method of controlling projection illuminance of a projection apparatus includes a system of changing display luminance of a projection device. To perform the control frame by frame, control of performing an operation in synchronization with a vertical synchronizing signal is necessary. Japanese Patent Laid-Open No. 2002-189458 (hereinafter, "Document 1") realizes the frame-by-frame control of the display luminance by controlling the luminance of frame-by-frame images to display the images. Another method of controlling the projection illuminance of the projection apparatus includes a system of changing the luminance of a lighting optical unit (projection light source). Japanese Patent Laid-Open No. 2008-76611 (hereinafter, "Document 2") describes a projector that changes the luminance of the lighting optical unit based on mode information indicating one of still image display and moving image display.

However, in an apparatus that needs to project only a desired frame unlike in a three dimensional measurement apparatus that needs to project a frame-by-frame video, the power is wasted in the conventional example in which the projection light source is continuously lit in each frame. In a projection apparatus used for three dimensional measurement, asynchronous control is performed when the control is not performed in frame synchronization. Therefore, real-time control cannot be performed, and redundant time is generated. The time prevents high-speed measurement. Video data is calculated to control frame-by-frame luminance in Document 1. However, frame-by-frame control cannot be performed using control information other than the video data. Therefore, the frame-by-frame control cannot be performed not only for a projection device, but also for other peripheral devices. In Document 2, the luminance of the light source is changed according to only the mode information unrelated to the frames.

SUMMARY OF THE INVENTION

The prevent invention has been made in view of the foregoing problems, and an embodiment of the present invention provides a projection control apparatus and a projection control method that can control operation of a projection apparatus in each frame.

According to one aspect of the present invention, there is provided a projection control apparatus for controlling a projection apparatus, the projection control apparatus comprising: a receiving unit configured to receive a video signal including a plurality of color components; an extraction unit configured to extract information of a specific color component for each frame of the video signal received by the receiving unit; a generating unit configured to generate, frame by frame, projection control information for controlling the projection apparatus based on the information of the specific color component extracted by the extraction unit; and a providing unit configured to provide the projection control information generated by the generating unit to the projection apparatus.

Further features of the present invention will become apparent from the following description of exemplary embodiments with reference to the attached drawings.

BRIEF DESCRIPTION OF THE DRAWINGS

FIG. 8 is a block diagram showing a configuration example of a projector according to the second embodiment;

FIG. 14 is a block diagram showing a configuration example of the projection control apparatus according to the fourth embodiment.

DESCRIPTION OF THE EMBODIMENTS

Hereinafter, some suitable embodiments of the present invention will be described with reference to the attached drawings.

First Embodiment

Figure 1:
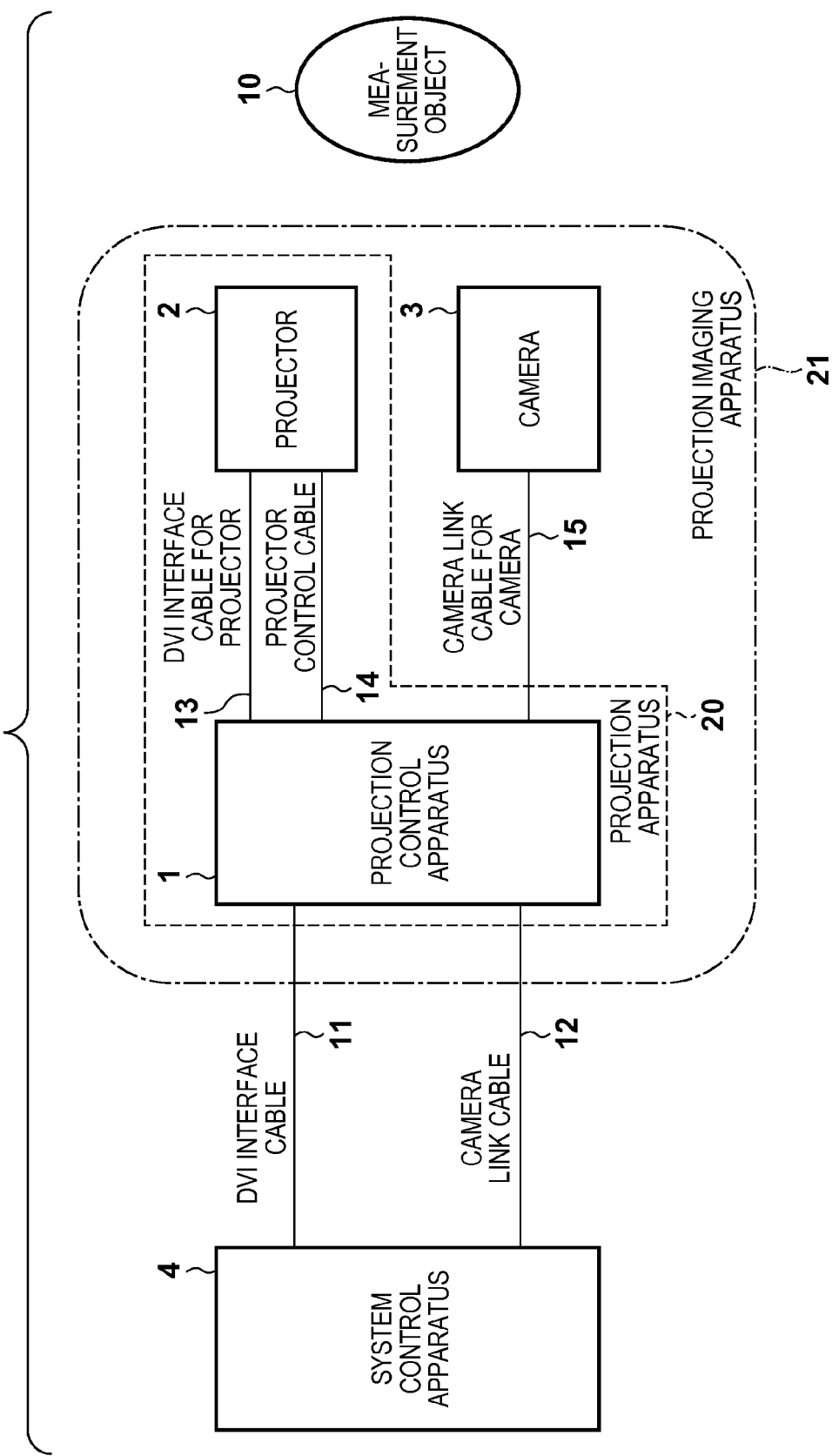
FIG. 1 is a block diagram showing a configuration example of a three dimensional measurement apparatus according to a first embodiment.

FIG. 1 is a block diagram showing a configuration of a three dimensional measurement apparatus according to a first embodiment. In FIG. 1, a projection apparatus 20 includes a projection control apparatus 1 and a projector 2. The projection control apparatus 1 and the projector 2 are connected by a DVI interface cable 13 for projector and a projector control cable 14. A camera 3 is connected as an imaging apparatus that is an external apparatus other than the projection apparatus. The camera 3 includes an imaging optical system and an image sensor, and the camera 3 takes an image. The camera 3 and the projection control apparatus 1 are connected by a camera link cable 15 for camera. The projection apparatus 20 and the camera 3 form a projection imaging apparatus 21 suitable for three dimensional measurement. A system control apparatus 4 is connected to the projection apparatus 20 through a DVI interface cable 11 and a camera link cable 12. The system control apparatus 4 controls projection of a pattern and imaging by the projection imaging apparatus 21 and three-dimensionally measures a measurement object 10. For example, a general-purpose computer, such as a personal computer, can be used as the system control apparatus 4. The system control apparatus 4 and the projection imaging apparatus 21 form a three dimensional measurement apparatus. A schematic principle of the three dimensional measurement and operation of the three dimensional measurement apparatus according to the present embodiment will be described with reference to FIG. 1.

The present embodiment describes an example of a shape measurement method using a pattern projection method also called a space encoding method. In the pattern projection method, the system control apparatus 4 sends projection patterns to the projection apparatus 20 through the DVI interface cable 11 to sequentially display negative and positive gray code patterns. In the projection apparatus 20, the projection control apparatus 1 causes the projector 2 to project the projection patterns received from the system control apparatus 4. As a result, the projection patterns (gray code patterns) sent from the system control apparatus 4 are projected to the measurement object 10. The camera 3 images, at a different angle, reflected light of the gray code patterns reflected on the surface of the measurement object 10. Therefore, the camera 3 images gray code patterns modified by the shape of the measurement object 10. The image data is transmitted to the system control apparatus 4 through the projection control apparatus 1 to analyze the images. The system control apparatus 4 projects two kinds of negative and positive gray code patterns to the measurement object 10 and calculates code values from boundary positions of negative and positive images in images obtained by imaging the measurement object 10. In this way, the system control apparatus 4 calculates distance information based on a principle of triangulation.

To take images while switching a plurality of projection patterns, the timing of projection by the projector 2 and the timing of imaging by the camera 3 need to match. Therefore, the projection control apparatus 1 generates, for the projector 2, a projection control signal for setting the display start, display period, display luminance, and the like. The projection control apparatus 1 generates, for the camera 3, an imaging control signal including a signal for controlling a shutter, such as shutter start time and shutter on time, and including a signal for setting a gain and the like in imaging. The projection control apparatus 1 generates the image data and the control data (projection control signal and imaging control signal) based on information from the system control apparatus 4.

The projection pattern needs to be switched frame by frame to execute a faster projection/imaging process. The control signal can be a signal that completes within one frame, and the control signal can be updated frame by frame to perform the control in synchronization with the frames.

The system control apparatus 4 creates a plurality of projection patterns and outputs video signals of the projection patterns to a DVI port as a general-purpose video signal interface to send the video signals to the projection control apparatus 1 through the DVI interface cable 11. The plurality of projection patterns are sequentially sent frame by frame. The system control apparatus 4 also creates control signals and embeds the control signals in the frames of the video signals to output the signals to the DVI port.

The projection control apparatus 1 decodes the video signal from the DVI interface cable 11 and creates signals of RGB color components (8 bits/pixel), a vertical synchronizing signal, a horizontal synchronizing signal, a video enable signal, and a signal of dot clock. Each color component signal includes 8 bits/pixel. The R component signal (color component signal of red) includes the control signal created by the system control apparatus 4. The control signal is used as information for controlling the projector 2 (projection control signal) and information for controlling the camera 3 (imaging control signal) and is transmitted to the projector 2 and the camera 3 through the projector control cable 14 and the camera link cable 15 for camera, respectively. The G component signal (color component signal of green) on the DVI interface cable 11 includes a projection pattern of 8 bits/pixel. The projection pattern is used as image output information for the projector 2. The image output information is encoded along with the vertical synchronizing signal, the horizontal synchronizing signal, the video enable signal, and the dot clock decoded in advance in the projection control apparatus. The image output information is transmitted to the projector 2 through the DVI interface cable 13 for projector, as a DVI signal that is a general-purpose interface. The projection control apparatus 1 also serves as a bridge between the camera link cable 15 for camera connected to the camera 3 and the camera link cable 12 connected to the system control apparatus 4.

The projector 2 has a function of projecting, to the measurement object 10, the image information transmitted through the DVI interface cable 13 for projector. The light source of the projector 2 is, for example, a light emitting diode (LED), and the projection control apparatus 1 receives information for controlling lighting of the light source through the projector control cable 14.

While the projector 2 projects the projection pattern to the measurement object 10, the camera 3 images the measurement object 10 from a position different from the projector 2. The execution and the like of imaging are controlled so that the camera 3 takes an image only in a desired frame. The projection control apparatus 1 creates imaging control information necessary for the control of the camera 3 and transmits the imaging control information to the camera 3 through the camera link cable 15 for camera. Image data taken by the camera 3 is transmitted to the system control apparatus 4 through the camera link cable 15 for camera, the projection control apparatus 1, and the camera link cable 12.

The system control apparatus 4, constructed by a general-purpose computer, transmits a desired projection pattern and control information to the DVI interface cable 11 through a built-in video board (not shown). The image data of the camera 3 transmitted from the projection control apparatus 1 through the camera link cable 12 is imported by the system control apparatus 4 through a capture board (not shown) embedded in the system control apparatus 4. Dedicated application software incorporated into the system control apparatus 4 transmits the desired projection pattern and the control information, imports the image data, and processes the imported image data. The application software is configured to obtain shape recognition of the measurement object 10, and the application software may also have a function of controlling a connected robot (not shown) to process, hold, or move the measurement object 10.

Figure 2:
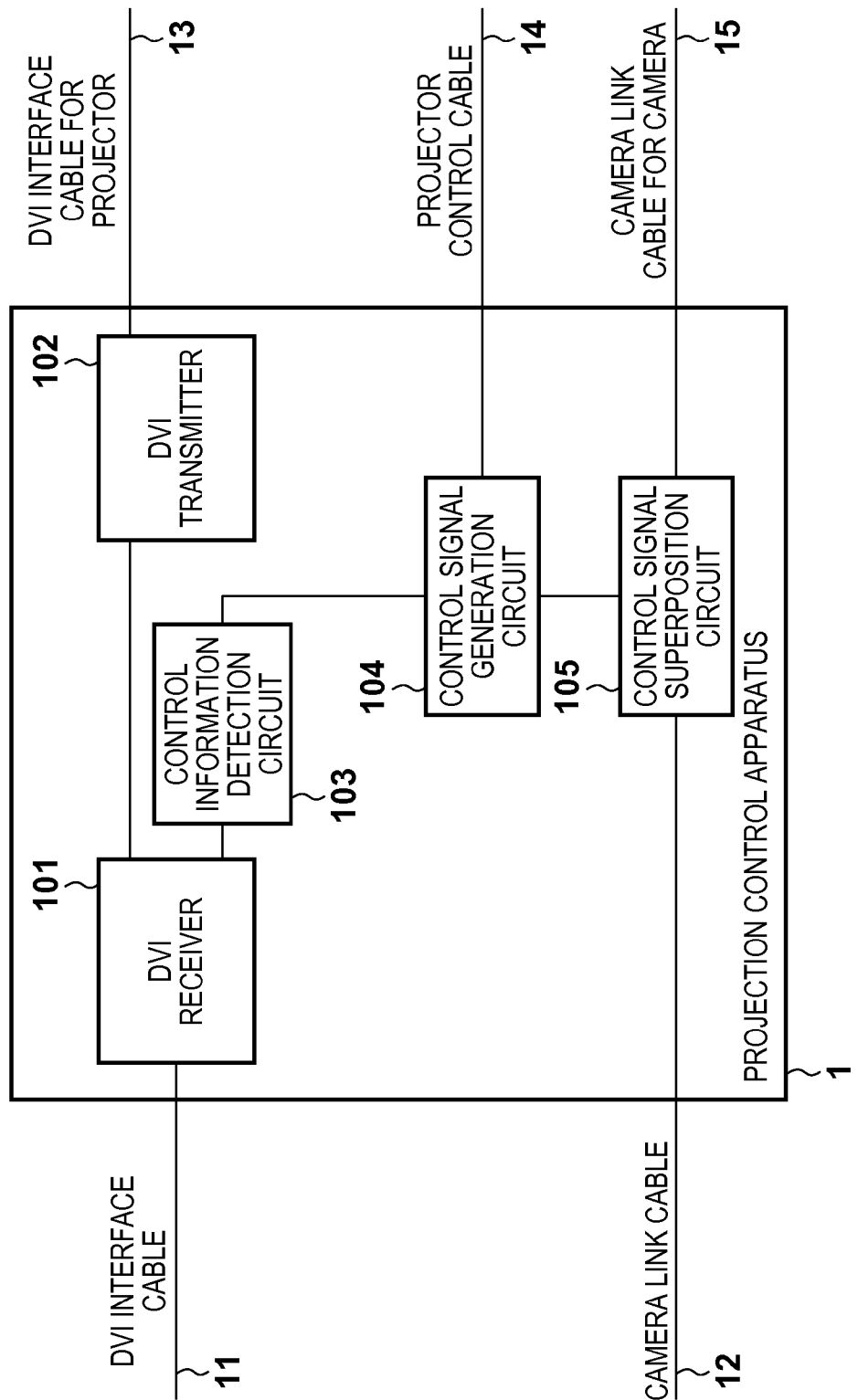
FIG. 2 is a block diagram showing a configuration example of a projection control apparatus according to the first embodiment.
Figure 3:
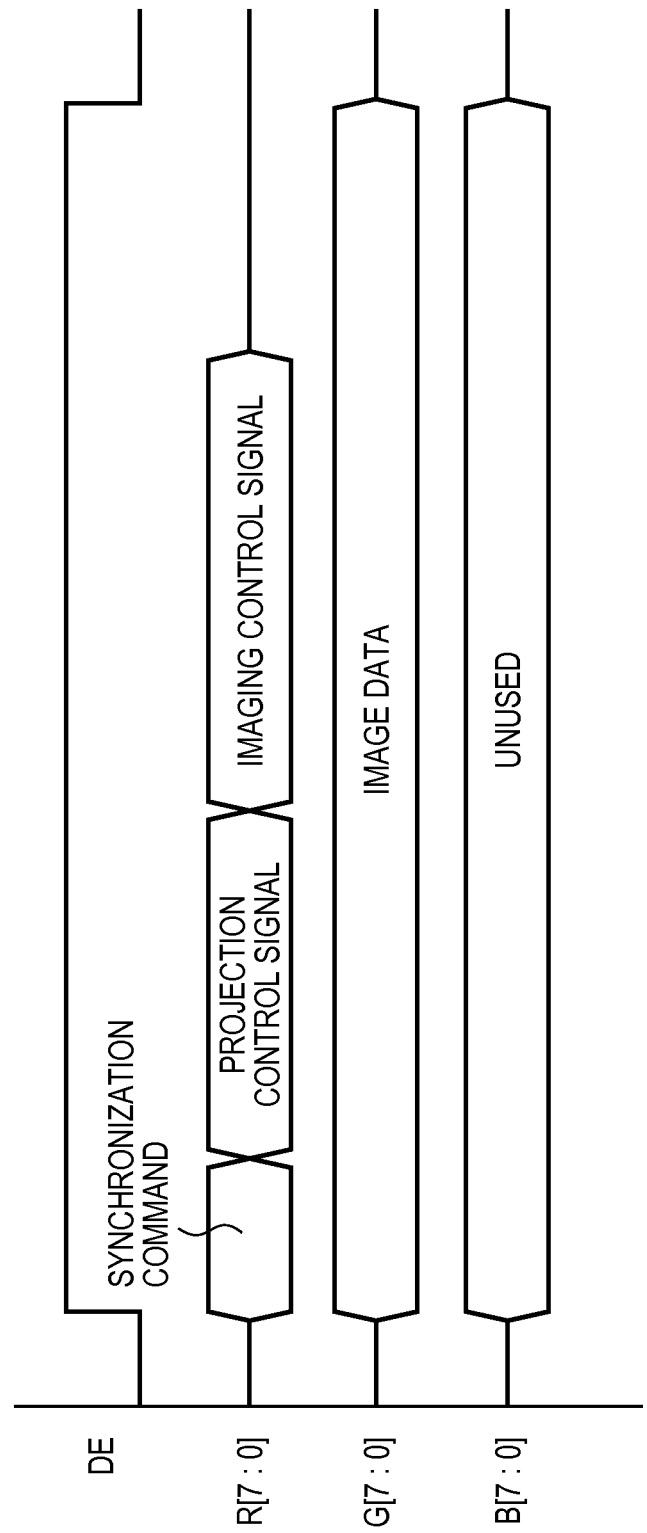
FIG. 3 is a diagram showing a data configuration example of a video signal of one frame.

Operation of the system control apparatus 4 and the projection control apparatus 1 of the present embodiment will be described with reference to FIGS. 2 to 5. In FIG. 2, the video signal transmitted from the system control apparatus 4 through the DVI interface cable 11 is a high-speed serial signal including image data of R, G, and B color components. A DVI receiver 101 receives and decodes the high-speed serial signal to generate color component signals of 8 bits/pixel each (R component signal, G component signal, and B component signal), a vertical synchronizing signal, a horizontal synchronizing signal, a video enable signal, and a signal of dot clock. In this case, as shown in FIG. 3, a signal of a specific color component (R component signal in the example) includes a synchronization command, projection control information, and imaging control information. Another color component signal (G component single in the example) includes image data. Information of the B component signal is not used.

The synchronization command is information for indicating tops of the following projection control signal and imaging control signal. The projection control information is information related to a projection operation of the projector 2 and includes, for example, projection enable, projection start timing, projection time, and projection luminance. The imaging control information is information for the camera 3 and includes imaging enable, imaging start timing, imaging time, and the like. FIG. 3 shows a timing chart within one frame. Therefore, the content of the projection control information, the imaging control information, and the image data can be changed frame by frame.

Figure 4:
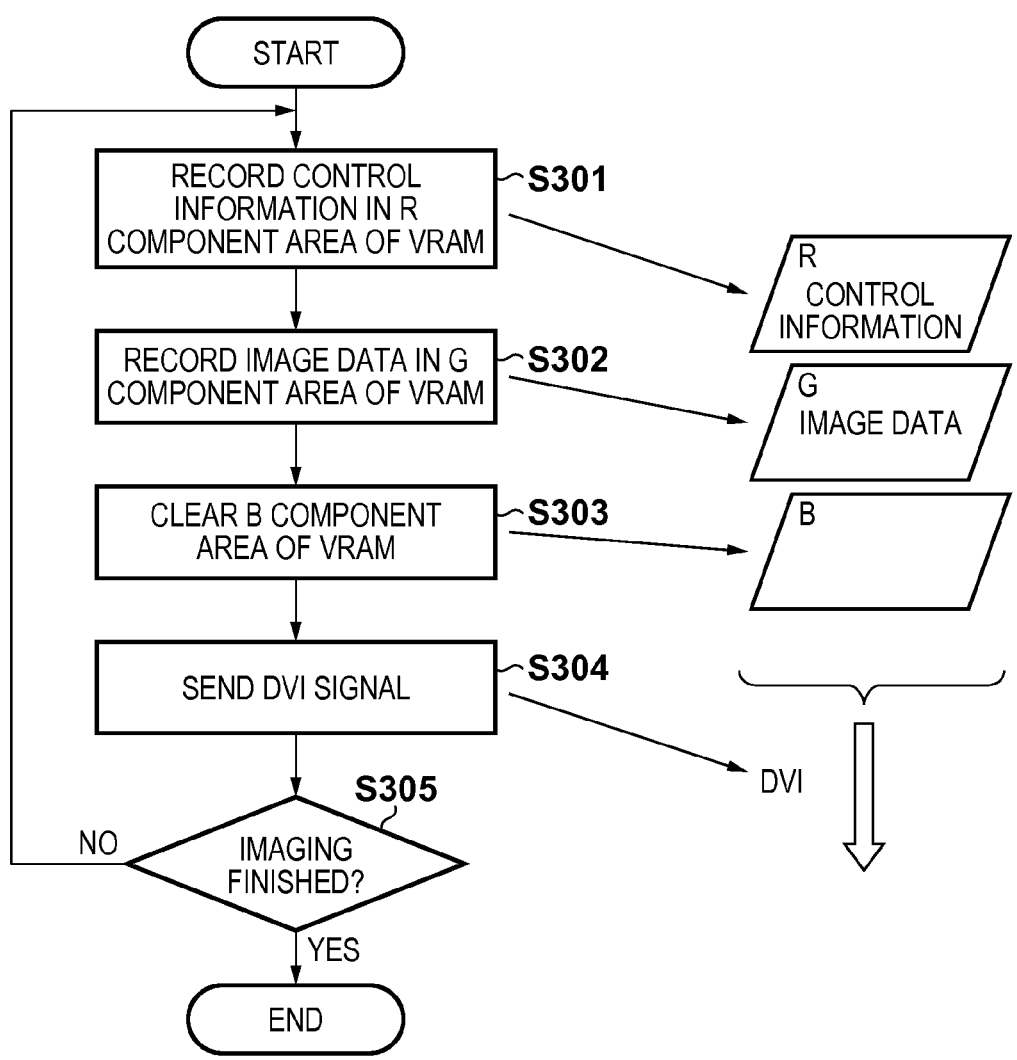
FIG. 4 is a flow chart for describing generation of the video signal by a system control apparatus.

A generation process of the video signal in the system control apparatus 4 that generates the video signal will be described with reference to a flow chart of FIG. 4. In step S301, the system control apparatus 4 describes the control information in an R component area for storing image information of an R (red) component of a VRAM included in a video interface. The control information described in step S301 is control information for controlling the operation of the projector 2 and the camera 3 (for example, the synchronization command, the projection control information, and the imaging control information). In step S302, the system control apparatus 4 describes image data (gray code pattern) to be projected by the projector 2 in an area for storing image information of a G (green) component of the VRAM. In S303, the system control apparatus 4 clears an area for storing image information of a B (blue) component of the VRAM. The image information of the B component is not used, and step S303 may be skipped. In step S304, the system control apparatus 4 uses the information stored in the VRAM to generate a video signal compliant with the DVI interface and sends the video signal to the projection control apparatus 1. The process is repeated until an instruction for finishing the projection is detected (step S305).

In this way, the synchronization command, the projection control signal, and the imaging control signal are described in the specific color component among the color components of the video signal. The DVI receiver 101 extracts the control signals from the signal of the specific color component. The image data to be projected by the projector 2 is described in the color components other than the specific color component.

A control information detection circuit 103 detects the projection control information related to the projection and the imaging control information related to the imaging from the R component signal output from the DVI receiver 101 and transmits the content to a circuit of the next stage. A control signal generation circuit 104 receives the projection control information and the imaging control information detected by the control information detection circuit 103 and generates and outputs the projection control signal for the projector 2 and the imaging control signal for the camera 3. More specifically, for example, the projection control signal for the projector 2 can be a lighting signal of positive logic for lighting a light emitting diode (hereinafter, "LED") as a projection light source of the projector 2. In this case, based on the projection control information from the control information detection circuit 103, the control signal generation circuit 104 expresses whether to light the light source in the frame based on presence/absence of signal output, expresses LED-on start timing counted from the vertical synchronizing signal in the frame by a start position of the signal output, and generates a lighting signal that expresses LED-on time by a pulse width of the signal output.

Furthermore, for example, the imaging control signal for the camera 3 can be a shutter signal of positive logic for controlling the shutter of the camera 3. In this case, based on the information from the control information detection circuit 103, the control signal generation circuit 104 expresses whether to take an image in the frame based on presence/absence of signal output, expresses image start timing counted from the vertical synchronizing signal in the frame by a start position of the signal output, and generates a shutter signal that expresses imaging time (shutter speed) by a pulse width of the signal output.

A control signal superposition circuit 105 superimposes the imaging control signal (for example, the shutter signal) generated by the control signal generation circuit 104 on CC2 of a camera link signal in the camera link cable. More specifically, the control signal superposition circuit 105 first disconnects a CC2 signal received from the camera link cable 12 in the projection control apparatus 1. The control signal superposition circuit 105 then connects the CC2 signal to output the imaging control signal for the camera 3 generated by the control signal generation circuit 104 to CC2 of the camera link cable 15 for camera. The camera 3 that receives the imaging control signal is set in advance to a mode for performing a shutter operation based on the positive logic according to the pulse of the CC2 signal. The system control apparatus 4 sets the mode through the camera link cable 12, the projection control apparatus 1, and the camera link cable 15 for camera.

A DVI transmitter 102 is provided as a general-purpose IC. The DVI transmitter 102 generates a DVI signal as a general-purpose video interface based on the R component signal, the G component signal, the B component signal, the vertical synchronizing signal, the horizontal synchronizing signal, the video enable signal, and the dot clock from the DVI receiver 101. In the projection control apparatus 1, the DVI transmitter 102 is connected so that G component signal output including image data from the DVI receiver 101 is input to the RGB color component signals of the DVI transmitter 102. In this way, G 8-bit image data transmitted from the DVI interface cable 11 is output by converting the data to high-speed serial signals for the RGB colors of the DVI interface cable 13 for projector.

Figure 5:
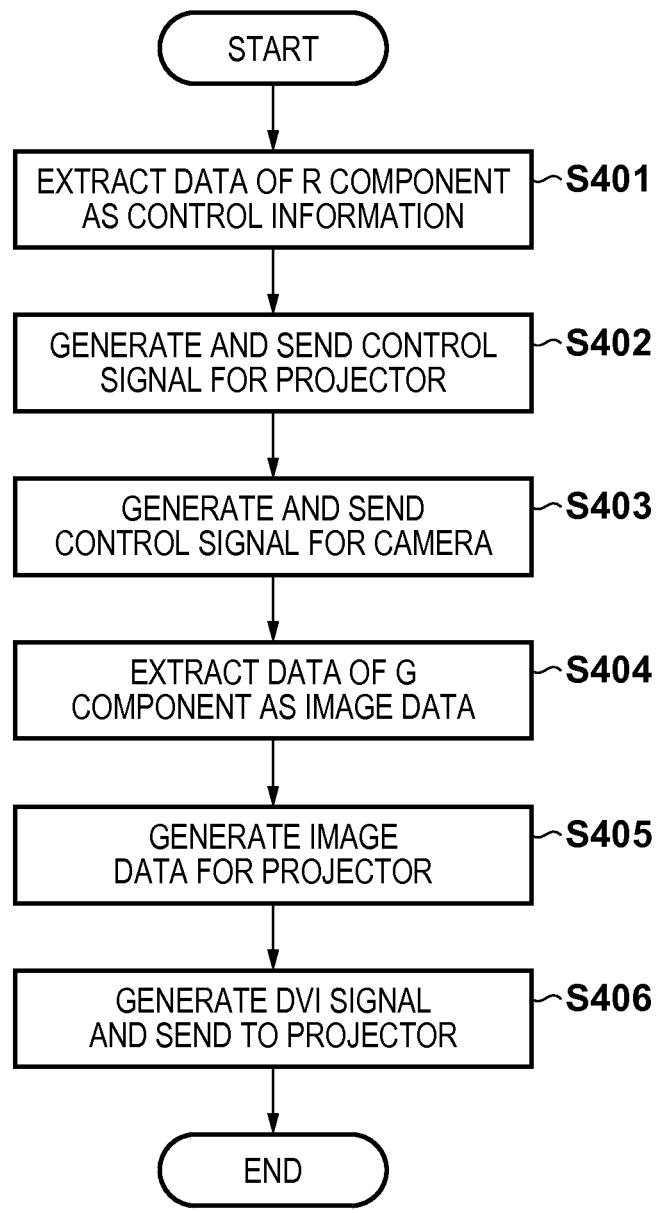
FIG. 5 is a flow chart for describing operation of the projection control apparatus.

The control of the projector 2 by the projection control apparatus 1 described above will be described with reference to a flow chart of FIG. 5. The process shown in FIG. 5 is executed frame by frame. The DVI receiver 101 receives the video signal received from the system control apparatus 4 and extracts data of the R component in the color component data to provide the data to the control information detection circuit 103 (step S401). The control information detection circuit 103 detects the projection control information and the imaging control information from the extracted data of the R component and provides the information to the control signal generation circuit 104 (step S401). The control signal generation circuit 104 generates the projection control signal for the projector 2 based on the projection control information provided from the control information detection circuit and sends the projection control signal to the projector 2 through the projector control cable 14 (step S402). The control signal generation circuit 104 generates the imaging control signal for controlling the operation of the camera 3 based on the imaging control information and provides the imaging control signal to the control signal superposition circuit 105. The control signal superposition circuit 105 superimposes the imaging control signal on the camera link signal to send the signal (step S403).

Meanwhile, the DVI receiver 101 sends the image data of the G component to the DVI transmitter 102 (step S404). The DVI transmitter 102 generates the video signal for the projector 2 based on the provided image data. In the present embodiment, the DVI transmitter 102 handles the image data provided from the DVI receiver 101 as image data of the color components of all R, G, and B to generate the image data to be projected by the projector 2 (step S405). The DVI transmitter 102 generates the video signal to be sent from the DVI interface to the projector 2 based on the generated image data and sends the video signal (step S406).

As described, according to the present embodiment, various operations in the projector 2 which performs frame projection and in the camera 3 as an external apparatus (peripheral device) other than the projector 2 can be controlled in synchronization with the frames. More specifically, the projection operation of the projector 2 and the imaging operation of the camera 3 as a peripheral device of the projector 2 can be easily controlled frame by frame. In this way, the control can be performed frame by frame by performing various controls of the apparatuses that perform the frame projection in synchronization with the frames. The measurement can be speeded up, and the power can be saved.

Second Embodiment

Figure 6:
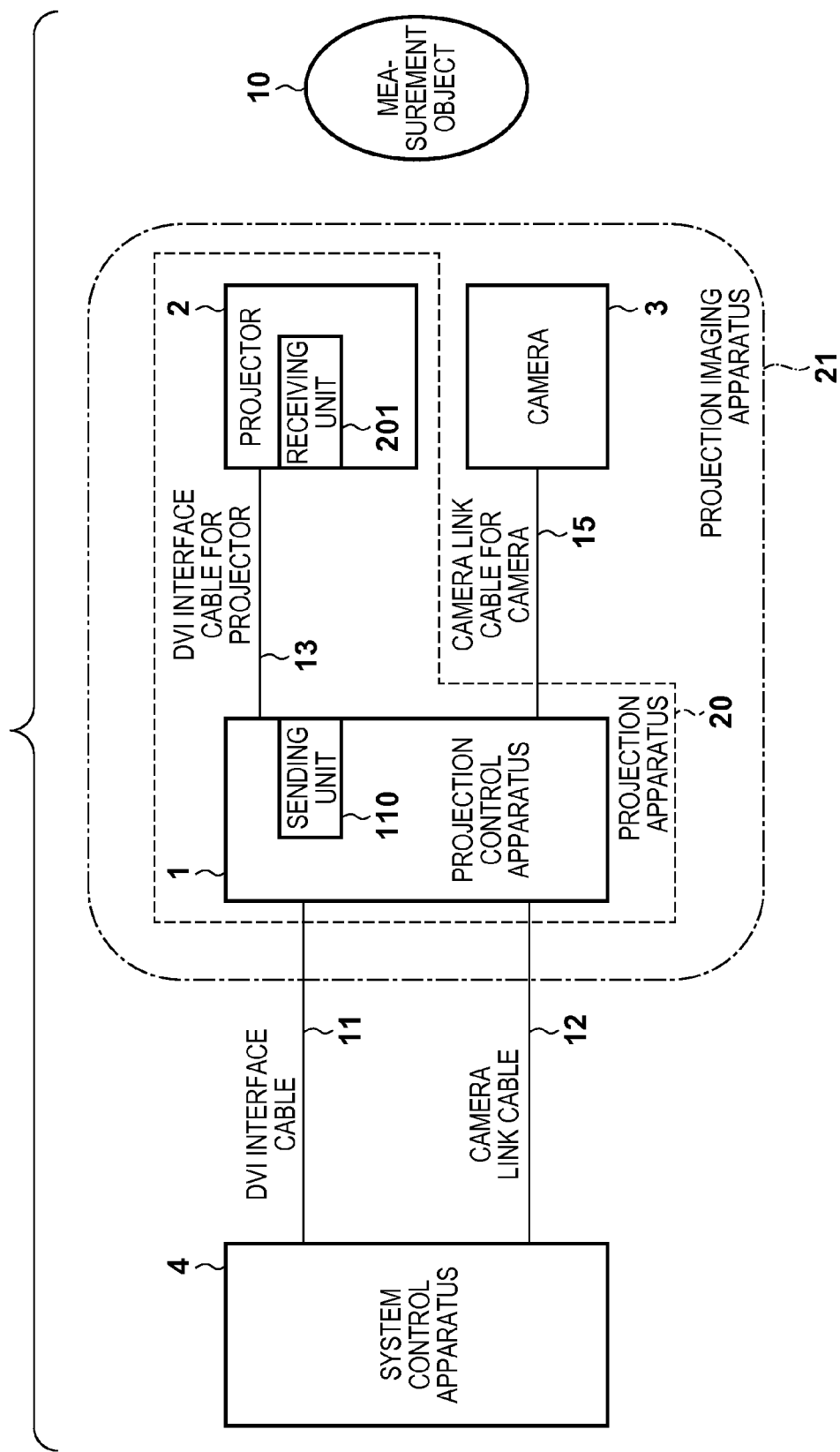
FIG. 6 is a block diagram showing a configuration example of the three dimensional measurement apparatus according to a second embodiment.

FIG. 6 is a block diagram showing a configuration of the three dimensional measurement apparatus according to a second embodiment. Differences from the first embodiment (FIG. 1) are that the projector control cable 14 in FIG. 1 is not included and that a sending unit 110 in the projection control apparatus 1 and a receiving unit 201 in the projector 2 are added. The sending unit 110 and the receiving unit 201 transfer information through wireless communication. The second embodiment will be described with reference to FIG. 6. The configuration is the same as in the first embodiment except for around the changes.

In FIG. 6, the sending unit 110 wirelessly sends, to the projector 2, the projection control signal for the projector 2 generated in the projection control apparatus 1. Examples of the communication medium of the sending unit 110 include a radio wave, light, and an ultrasonic wave. The receiving unit 201 arranged on the projector 2 receives the information transmitted by the sending unit 110. The content received by the receiving unit 201 is interpreted in the projector 2 and is used for various controls frame by frame. Examples of the various controls include the following items.

(a) Control of whether to emit the projection light source, lighting start timing of the projection light source, lighting time of the projection light source, and lighting end timing of the projection light source.

(b) Control of whether to enable display device output.

(c) Control of an amount of light emission within one lighting time of the projection light source.

(d) Control of the lighting pattern of the projection light source.

(e) Selection of the projection image.

(f) Focus adjustment, trapezoidal distortion correction, lens zooming, designation of resolution of the projection video, and selection of image processing of the projection image.

(g) Control of the projection direction and the projection angle.

Figure 7:
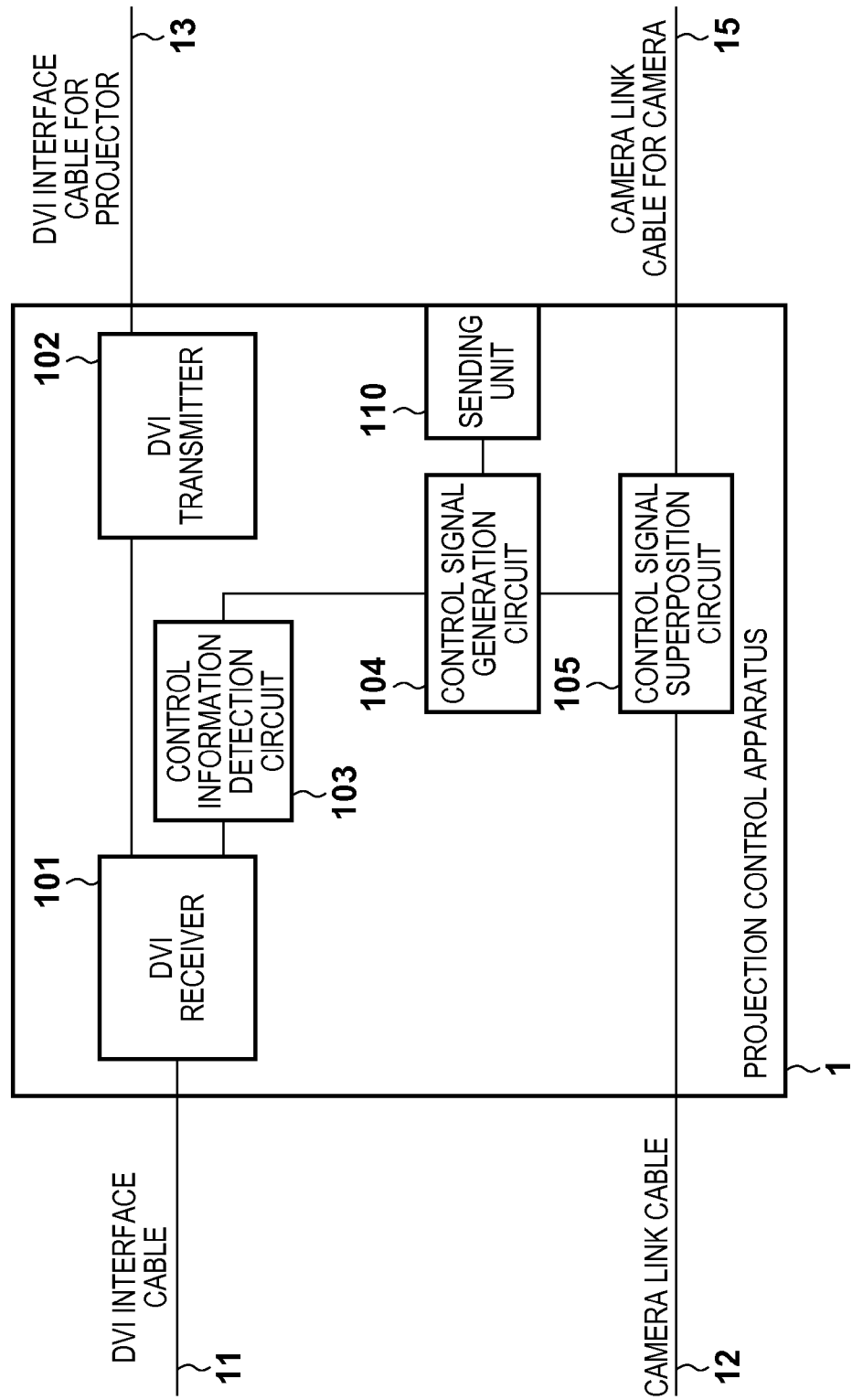
FIG. 7 is a block diagram showing a configuration example of the projection control apparatus according to the second embodiment.

Hereinafter, specific methods of the controls will be described with reference to FIG. 7. FIG. 7 is a diagram showing an internal function of the projection control apparatus 1 according to the present embodiment. The sending unit 110 wirelessly sends various projection control signals generated by the control signal generation circuit 104 to the projector 2.

"(a) Control of whether to emit the projection light source, lighting start timing of the projection light source, lighting time of the projection light source, and lighting end timing of the projection light source" can be attained by transmitting signal information of positive logic that is turned on at the timing when the LED is turned on. In this case, the simplest means for realization in the sending unit 110 is to control on/off of the transmission carrier based on the signal information of the positive logic. The four pieces of control information are not all necessary at the same time, and the following combinations are sufficient for the lighting start timing of the projection light source, the lighting time of the projection light source, and the lighting end timing of the projection light source. More specifically, a combination of the lighting start timing of the projection light source and the lighting time of the projection light source or a combination of the lighting start timing of the projection light source and the lighting end timing of the projection light source is sufficient. A method may also be used, in which all the lighting start timing of the projection light source, the lighting time of the projection light source, and the lighting end timing of the projection light source are sent, and the timing is determined based on priorities determined in advance in the projector 2 when the three timing values are inconsistent.

If only a piece of signal information of positive logic needs to be transmitted as in the example described above, the sending unit 110 can be realized by a simple function of on/off control of the transmission carrier. However, if other information described below is also sent frame by frame, a plurality of pieces of information needs to be multiplexed and sent. There are various general methods for the multiplexing, and the detail will not be described. For example, there is a method, in which the control information of control items is set to 8 bits, and the control information is arranged in a defined order to modulate the transmission carrier in the bit sequence.

Other than the control of whether to emit the projection light source, "(b) control of whether to enable display device output" can also be used as a method of controlling whether to perform the projection. The control can be realized by switching whether to enable the image data input to the display device or whether to mandatorily set a black screen. In another method, if there is an enable input command for performing a selection operation of whether to display the data on the display device, the input command can be controlled to realize the control.

In the "(c) control of an amount of light emission within one lighting time of the projection light source", the amount of light emission of the projection light source is changed to correct a time change of parameters in the frame. Examples of the time change of the parameters include light emission characteristics of the LED, responsiveness of the display device, noise caused by ambient light, and responsiveness of the imaging device of the camera 3. The control of the amount of light emission can be realized, for example, as follows. The projector 2 prepares a plurality of types of patterns indicating how to change the amount of light emission and stores the patterns in a memory. The projection control apparatus 1 sends, from the sending unit 110, information for selecting one of the plurality of patterns. The projector 2 selects one of the plurality of patterns stored in the memory according to the information received by the receiving unit 201 and changes the amount of light according to the selected pattern. The memory may not be included, and the pattern may be transmitted from the sending unit 110. In that case, although there is more information to be sent, there is more freedom in the pattern of the light amount change.

"(d) Control of the lighting pattern of the projection light source" is control of the lighting pattern in the frame when lighting is performed for a plurality of times in the frame. This allows LED drive that reduces an increase in the junction temperature of the LED. The control of the lighting pattern can be realized by a similar method as in the control of the pattern of the amount of light emission. For example, there is a method of storing a plurality of types of lighting patterns in the memory of the projector 2 in advance and selecting one of the lighting patterns based on the information sent from the sending unit 110 to control the lighting according to the selected pattern. Obviously, a method of sending a lighting pattern to change the lighting pattern is also possible. In that case, although there is more information to be sent, there is more degree of freedom in the lighting pattern.

In "(e) selection of the projection image", a plurality of pieces of gray code image information determined in advance by the projection control apparatus 1 are stored in the memory of the projector 2, and a predetermined instruction signal for selecting an image to be projected among the pieces of information is sent from the projection control apparatus 1. The target projection can be attained without receiving the image data from the system control apparatus 4. Therefore, the information received by the projection control apparatus 1 from the system control apparatus 4 is only the control information, and the interface between the two can be easily realized. In this case, the DVI interface cable 13 for projection can be omitted.

"(f) Focus adjustment, trapezoidal distortion correction, zooming, resolution of the projection video, and selection of image processing of the projection image" will be described with reference to FIG. 8. FIG. 8 is a block diagram showing an internal configuration of the projector 2. A DVI receiver 205 receives a DVI signal output by the projection control apparatus 1. The DVI receiver 205 decodes the DVI signal, which is a high-speed serial signal, to facilitate processing in a later stage and generates an R component signal, a G component signal, a B component signal, a vertical synchronizing signal, a horizontal synchronizing signal, a video enable signal, and a signal of a dot clock. An image processing circuit 206 imports the signals generated by the DVI receiver 205 to execute given image processing. The image data processed by the image processing circuit 206 is transmitted to a display device 207 of a later stage. The display device 207 imports the processed image data from the image processing circuit 206 to generate a projection video according to the image data and displays the projection video on, for example, a liquid crystal device. An optical unit 208 is an optical unit that converts projection output of the display device 207 to desired projection light.

A command decoding circuit 202 interprets the signal sent from the sending unit 110 of the projection control apparatus 1 and received by the receiving unit 201 and converts the signal to a necessary signal. A control circuit 203 receives the signal obtained by the command decoding circuit 202 and controls the device according to the signal. A motor 204 adjusts positions, angles, and the like of the components in the optical unit 208. A high-speed motor, such as a piezo actuator, is used to perform the control frame by frame.

If the command interpreted by the command decoding circuit 202 is for focus adjustment, trapezoidal distortion correction, and zoom adjustment, the control circuit 203 operates the motor 204 to adjust the optical unit 208 based on the command to set desired focus, trapezoidal distortion correction, and zoom. The trapezoidal distortion correction and the zoom adjustment can be realized by processing the image information. In that case, the control circuit 203 controls the image processing circuit 206, and the image processing circuit executes necessary image processing.

If the command interpreted by the command decoding circuit 202 is for designation of resolution of the projection video and selection of image processing of the projection image, the control circuit 203 controls the image processing circuit 206. Based on the control, the image processing circuit 206 executes image processing, such as resolution conversion, brightness adjustment, contrast adjustment, sharpness adjustment, gamma adjustment, color adjustment, and noise reduction processing. As for the various adjustment items described with reference to FIG. 8, the functions are included as functions of a generally available projector, and the processing method will not be described in detail here.

Figure 9A:
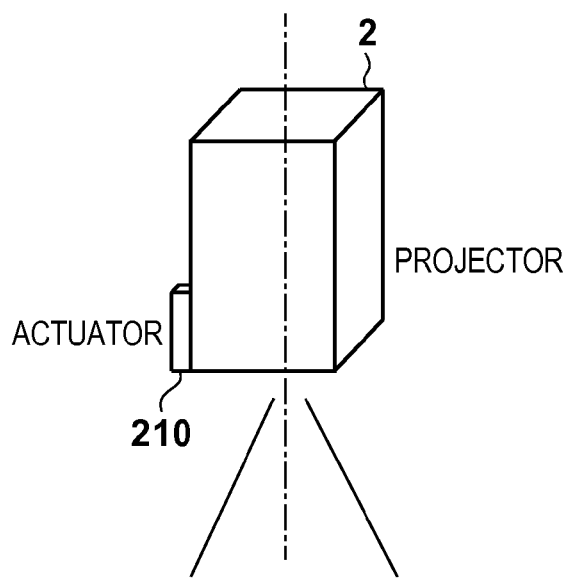
FIGS. 9A to 9D are diagrams for describing adjustment of a projection direction and a projection angle of the projector.
Figure 9B:
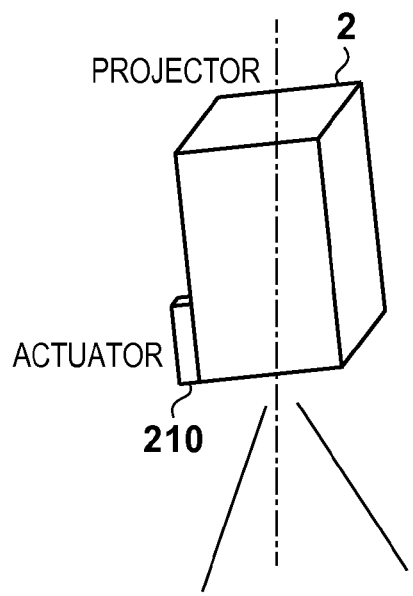

"(g) Control of the projection direction and the projection angle of the projector 2" will be described with reference to FIGS. 9A to 9D. Adjustment of the projection direction will be described first with reference to FIGS. 9A and 9B. FIG. 9A illustrates a state of downward projection by the projector 2. An actuator 210 has a function of changing an angle between an installation support member of the projector 2 not shown and the projector 2 to change the projection direction. The change in the angle of the projector 2 changes the projection direction of the projector 2. If the signal received by the receiving unit 201 includes an instruction for adjusting the projection direction, the control circuit 203 controls the actuator 210 to change the projection direction of the projector 2 by a desired amount. FIG. 9B illustrates a state after the change in the angle of the projector 2 from the state of FIG. 9A. A high-speed actuator, such as a piezo actuator, is used as the actuator 210 to perform the control frame by frame.

Figure 9C:
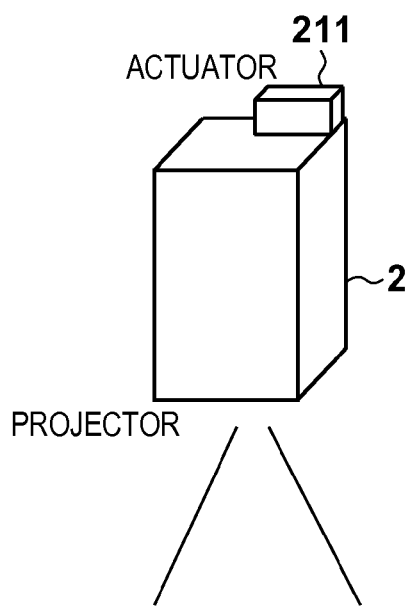
Figure 9D:
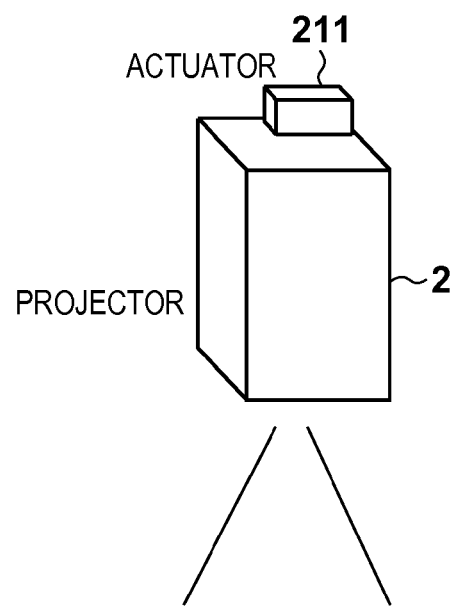

Adjustment of the projection angle of the projector 2 will be described with reference to FIGS. 9C and 9D. FIG. 9C illustrates a state of downward projection by the projector 2. An actuator 211 has a function of changing the angle between the installation support member of the projector 2 not shown and the projector 2 to change the projection angle (angle around the projection axis). The change in the projection angle of the projector 2 does not change the projection direction of the projector 2. If the signal received by the receiving unit 201 includes an instruction for adjusting the projection angle, the control circuit 203 controls the actuator 211 to change the projection angle of the projector 2 by a desired amount. FIG. 9D illustrates a state after the change in the angle of the projector 2 from the state of FIG. 9C. A high-speed actuator, such as a piezo actuator, is used as the actuator 211 to perform the control frame by frame.

It is obvious that the projector control cable 14 of the first embodiment can also be used to realize the communication of the control information shown in the second embodiment. For example, the control of the light emission amount pattern and the lighting pattern of the projection light source as well as the control of the projection direction and the projection angle of the projector 2 by the actuators can be clearly applied to the configuration of the first embodiment.

Third Embodiment

Figure 10:
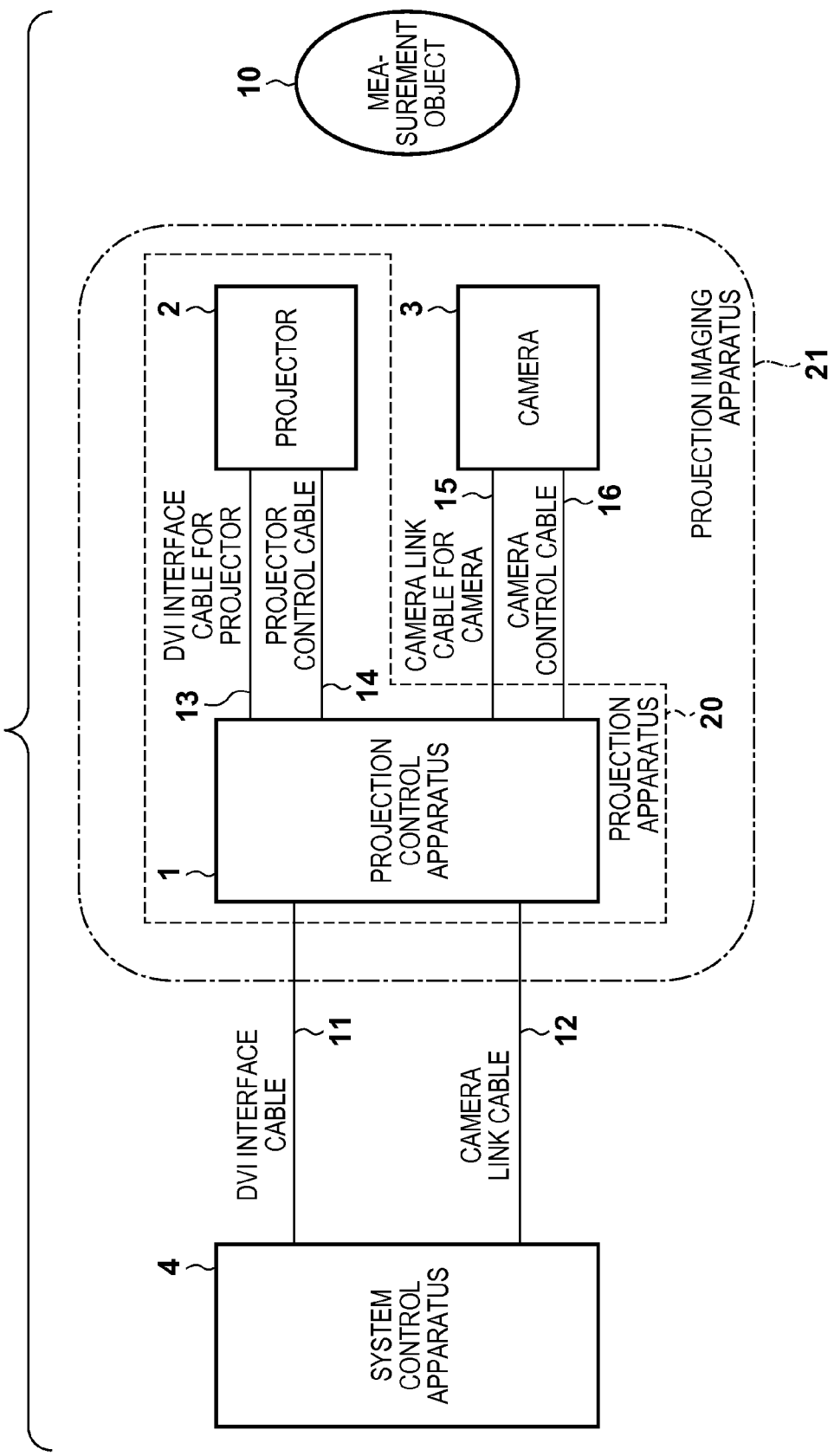
FIG. 10 is a block diagram showing a configuration example of the three dimensional measurement apparatus according to a third embodiment.

FIG. 10 is a block diagram showing a configuration of the three dimensional measurement apparatus according to a third embodiment. A camera control cable 16 has a function of transmitting the control information from the projection control apparatus 1 to the camera 3 and transmitting the information of the camera 3 to the projection control apparatus 1. A difference between FIG. 10 and the first embodiment (FIG. 1) is that the camera control cable 16 is added. Although only the function of the projector control cable 14 for transmitting the control information from the projection control apparatus 1 to the projector 2 has been described in FIG. 1, the projector control cable 14 has a function of two-way communication in the present embodiment. Therefore, the projector control cable 14 has a function of transmitting the control information from the projection control apparatus 1 to the projector 2 and transmitting the information of the projector 2 to the projection control apparatus 1.

Figure 11:
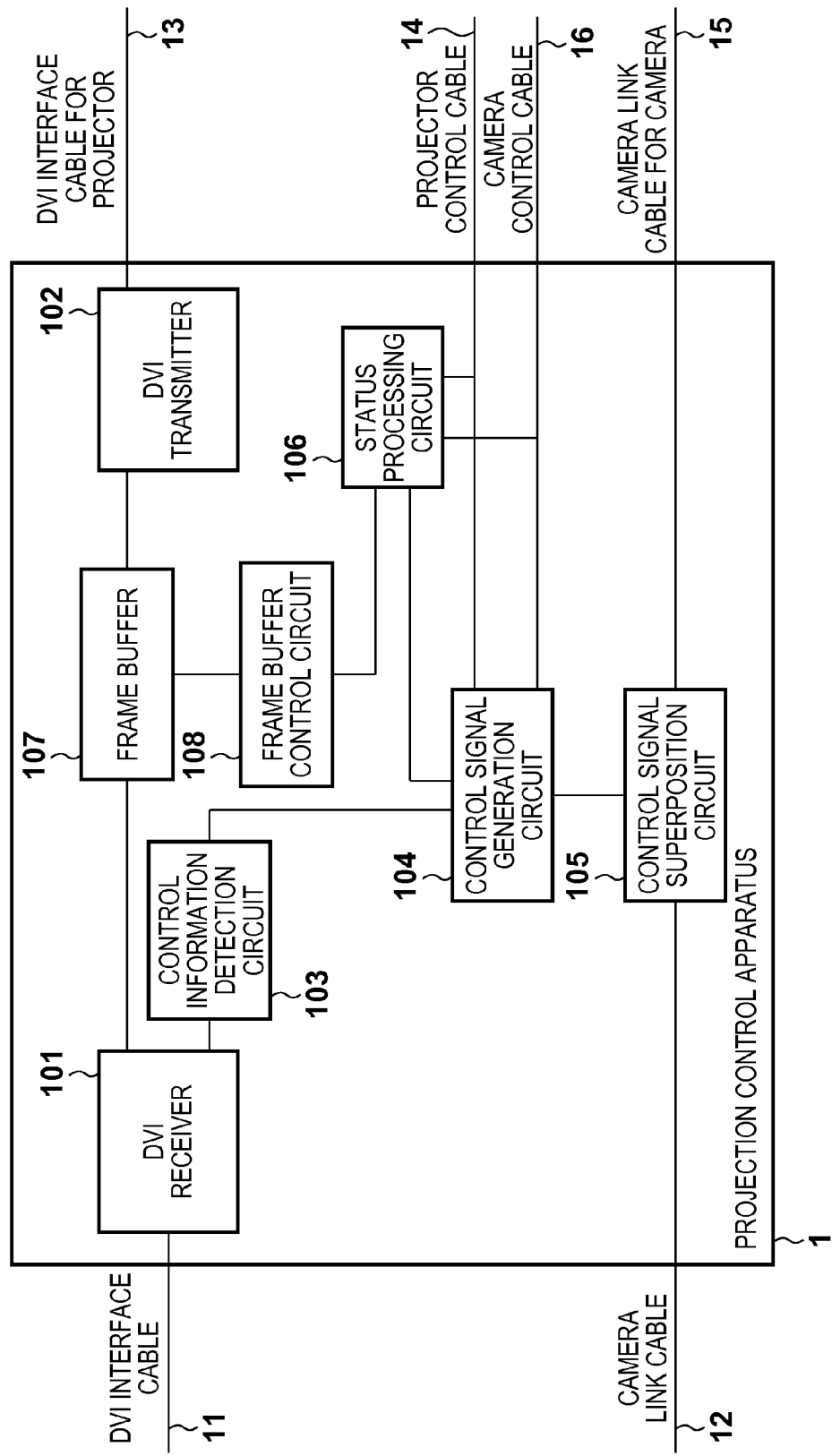
FIG. 11 is a block diagram showing a configuration example of the projection control apparatus according to the third embodiment.

FIG. 11 is a block diagram showing a configuration of the projection control apparatus 1 according to the third embodiment. A status processing circuit 106 receives status information of the projector 2 transmitted from the projector 2 through the projector control cable 14 and status information of the camera 3 transmitted from the camera 3 through the camera control cable 16. The status processing circuit 106 determines a necessary process based on the content of the received status information. A frame buffer 107 has a capacity that can store image data of some frames. A frame buffer control circuit 108 controls the frame buffer 107. Differences between the projection control apparatus 1 of the present embodiment (FIG. 11) and the projection control apparatus 1 of the first embodiment (FIG. 3) are that the status processing circuit 106, the frame buffer 107, the frame buffer control circuit 108, and a signal for the camera control cable 16 are added. The third embodiment will be described with reference to FIGS. 10 and 11. The configuration is the same as in the first embodiment except for around the changes.

The projection control apparatus 1 requests the projector 2 for status information through the projector control cable 14. In response to the request, the projector 2 transmits the status information of the projector 2 to the projection control apparatus 1 through the projector control cable 14. The status information of the projector 2 can include, for example, the temperature of the LED as a projection light source. The projection control apparatus 1 acquires the temperature of the LED (light source) frame by frame, and if necessary, issues, to the projector 2 through the projector control cable 14, an instruction for changing the drive current of the LED in order to set a desired value for the luminance of the LED. This can prevent variation in the luminance caused by temperature variation of the LED and can realize more highly accurate three dimensional measurement. In this case, the status processing circuit 106 receives the temperature information of the LED from the projector 2 through the projector control cable 14 and determines whether to adjust the luminance of the LED based on the information. If the status processing circuit 106 determines that the adjustment is necessary, the status processing circuit 106 transfers the control information to the control signal generation circuit 104, and the control signal generation circuit 104 controls the projector 2 through the projector control cable 14 based on the control information.

The projector 2 may have a function of automatically sending the status information to the projection control apparatus 1 through the projector control cable 14 even if there is no request for acquiring the status from the projection control apparatus 1. In this case, an example of the automatically sent status information includes error information when the LED is not lit or is not desirably lit for some reason. Based on the function, the status processing circuit 106 in the projection control apparatus 1 can detect, for example, the momentary stop of the LED. When the momentary stop of the LED is detected, the status processing circuit 106 instructs the frame buffer control circuit 108 to retransmit the sent image data. The frame buffer control circuit 108 that has received the instruction performs control to retransmit the sent image data of one frame stored in the frame buffer 107 to the projector 2 through the DVI interface cable 13 for projector.

At the same time as the retransmission of the image data, the status processing circuit 106 instructs the control signal generation circuit 104 to take an image. In response to the instruction, the control signal generation circuit 104 transmits a signal of imaging instruction to the control signal superposition circuit 105. The control signal superposition circuit 105 generates an imaging control signal, in which the signal of imaging instruction is superimposed, and transfers the imaging control signal to the camera 3 through the camera link cable 15 for camera. Based on the signal, the camera 3 performs an imaging operation.

At the same time as the imaging instruction, the control signal generation circuit 104 notifies the camera 3 that the imaging of the frame (imaging when the momentary stop of the LED is detected) is disabled, through the camera control cable 16. The camera 3 that has received the notification stops imaging or stops data transfer to terminate the operation in the frame. As a result of the suspension of the data from the camera 3 through the camera link cable 15 for camera, the projection control apparatus 1, and the camera link cable 12, the system control apparatus 4 determines that the frame is disabled and discards the partially received data. If the camera 3 terminates the operation before the start of the transfer of the imaging data, the projection control apparatus 1 does not particularly have to be conscious of the termination. The projection control apparatus 1 can import image data transmitted next from the camera 3 as a desired image to process the image.

The projection control apparatus 1 sends imaging control information to the camera 3 through the camera control cable 16. For example, the imaging information includes at least one of information of whether to turn on the shutter frame by frame, shutter start time counted from the vertical synchronizing signal in the frame, time that the shutter is open, shutter end time counted from the vertical synchronizing signal in the frame, gain adjustment, aperture adjustment, zooming, focusing, area designation in partial reading, frame rate, clock rate, and resolution. The control information can be sent frame by frame, and the camera 3 that has received the control information changes the setting based on the control information. The control items are general functions that can be set in a general-purpose camera, and the details will not be described here. The camera 3 is configured to receive the control items through the camera control cable 16 to set the items.

The projection control apparatus 1 sends an instruction for adjusting the imaging direction and the imaging angle through the camera control cable 16, and the camera 3 that has received the instruction changes the imaging direction and the imaging angle of the camera 3 according to the instruction.

Figure 12A:
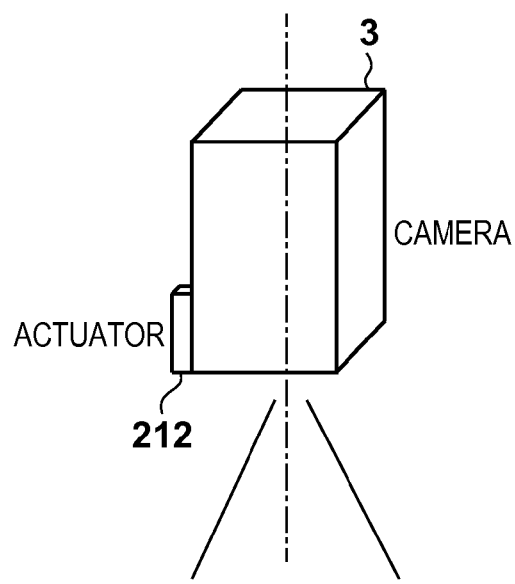
FIGS. 12A to 12D are diagrams for describing adjustment of an imaging direction and an imaging angle of a camera.
Figure 12B:
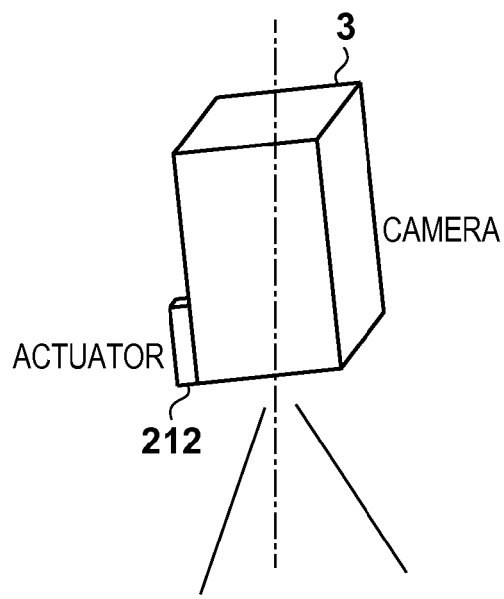

The adjustment of the imaging direction will be described with reference to FIGS. 12A to 12D. FIG. 12A illustrates a state of downward imaging by the camera 3. An actuator 212 has a function of changing the angle between an installation support member of the camera 3 (not shown) and the camera 3. The change in the angle changes the imaging direction of the camera 3. When the camera 3 receives an instruction for adjusting the imaging direction from the projection control apparatus 1 through the camera control cable 16, the camera 3 operates the actuator 212 to change the imaging angle of the camera 3 by a desired amount. FIG. 12B illustrates a state after the change in the imaging angle of the camera 3 from the state of FIG. 12A. A high-speed actuator, such as a piezo actuator, is used as the actuator 212 to perform the control frame by frame.

Figure 12C:
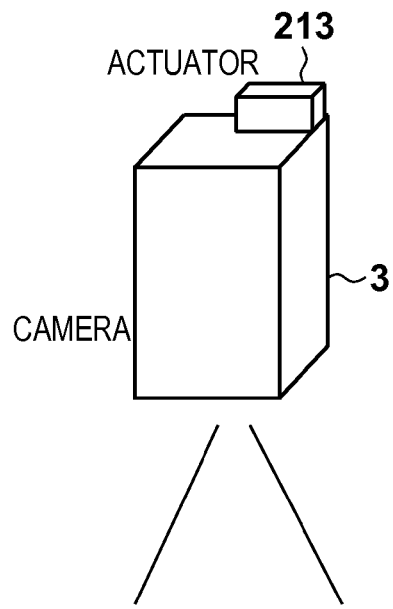
Figure 12D:
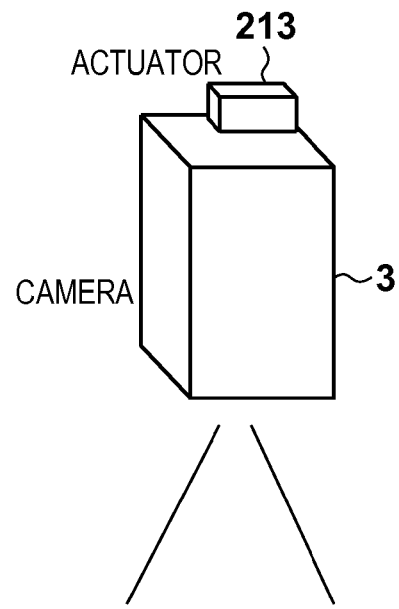

The adjustment of the imaging angle will be described with reference to FIGS. 12C and 12D. FIG. 12C illustrates a state of downward imaging by the camera 3. An actuator 213 has a function of changing the angle between the installation support member of the camera 3 not shown and the camera 3. Although the change in the angle does not change the imaging direction of the camera 3, the angle around the imaging direction is changed. When the camera 3 receives an instruction for adjusting the imaging angle from the projection control apparatus 1 through the camera control cable 16, the actuator 213 operates to change the imaging angle of the camera 3 by a desired amount. FIG. 12D illustrates a state after the change in the imaging angle of the camera 3 from the state of FIG. 12C. A high-speed actuator, such as a piezo actuator, is used as the actuator 213 to perform the control frame by frame.

Although the adjustment of the projection direction and the adjustment of the projection angle of the projector 2 have been described in the second embodiment, there can also be a control method, in which the control of the projector 2 and the adjustment of the imaging direction as well as the imaging angle of the camera 3 of the present embodiment are performed synchronously. There can also be a control method, in which a high-speed actuator unit as described above adjusts the projection and imaging directions as well as the projection and imaging angles of the entire projection imaging apparatus 21, which includes the projector 2 and the camera 3 fixed and installed in the same housing.

The projection control apparatus 1 requests the camera 3 for the status information through the camera control cable 16. In response to the request, the camera 3 transmits the status information of the camera 3 to the projection control apparatus 1 through the camera control cable 16. The status information of the camera 3 is, for example, shutter enable information. The projection control apparatus 1 performs shutter control of the camera 3 through the camera control cable 16 only if the information is enabled. In this case, the status processing circuit 106 receives the shutter enable information from the camera 3 through the camera control cable 16 and determines whether the shutter control is possible based on the information. When the status processing circuit 106 determines that the shutter control is possible, the status processing circuit 106 transfers the information to the control signal generation circuit 104. Based on the information, the control signal generation circuit 104 permits the shutter control information to be transmitted to the camera 3 through the camera control cable 16.

Fourth Embodiment

Figure 13:
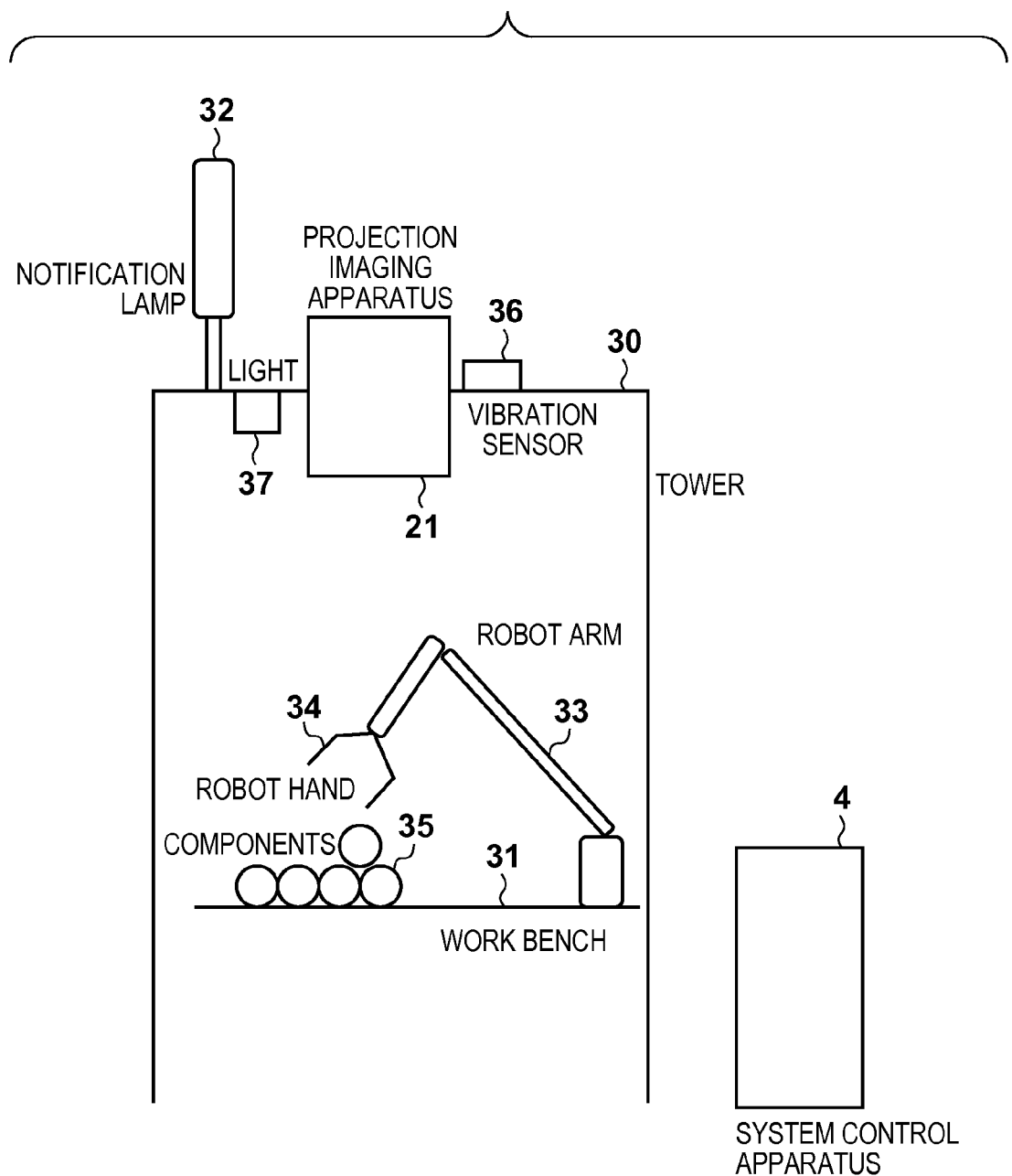
FIG. 13 is a diagram for describing a configuration of a fourth embodiment.

FIG. 13 is a diagram showing a configuration of an assembly robot using the three dimensional measurement apparatus according to a fourth embodiment. The projection imaging apparatus 21 described in the first to third embodiments, a notification lamp 32, a vibration sensor 36, a light 37, and a work bench 31 are supported by a tower 30. A robot arm 33 is disposed on the work bench 31. The notification lamp 32 visually notifies a device abnormality or a state of progress. The robot arm 33 can perform operation at an arbitrary location on the work bench 31 and includes a robot hand 34 that holds and assembles components 35 on the work bench 31. The vibration sensor 36 is arranged near the projection imaging apparatus 21, and the light 37 illuminates the work bench 31. The fourth embodiment will be described with reference to FIG. 11.

The system control apparatus 4 has a function of comprehensively controlling the various functions described above. For example, the system control apparatus 4 controls the projection imaging apparatus 21 to three-dimensionally measure the components 35 and controls the robot arm 33 and the robot hand 34 based on the information to hold and assemble the components 35. The system control apparatus 4 also imports information of the vibration sensor 36, and based on the information, corrects a measurement error caused by vibration of the projection imaging apparatus 21. The system control apparatus 4 also figures out an abnormality or a state of progress to control the notification lamp 32 if necessary and to perform control in related to the light 37.

If the vibration sensor 36 detects an abnormal vibration exceeding an expected value, the system control apparatus 4 determines that the error of the measurement cannot be corrected and instructs the projection imaging apparatus 21 to perform the measurement again. If a state that does not allow the continuation of the operation is detected, the system control apparatus 4 lights the notification lamp 32 and terminates the operation of the projection imaging apparatus 21, the robot arm 33, and the robot hand 34. Examples of the state that does not allow the continuation of the operation include a case in which the abnormal vibration continues for more than a certain time and a case in which a necessary operation is finished. In that case, the system control apparatus 4 also controls the notification lamp 32 to change the lighting color according to the state.

The system control apparatus 4 controls the emission color, the emission intensity, and the emission direction of the light 37 according to the operational condition on the work bench 31. The system control apparatus 4 has a function of importing the information of the vibration sensor 36 in synchronization with the frames and applying corrections frame by frame and has a function of importing and applying a correction operation to the information of the vibration sensor 36 only in a frame in which the measurement is performed. The system control apparatus 4 also has a function of analyzing the information from the vibration sensor 36 and selecting a correction method based on a vibration mode. For example, the system control apparatus 4 does not perform correction in a case of a high-frequency vibration with small amplitude, performs correction by controlling the projection direction or the projection angle of the projector 2 or by controlling the imaging direction or the imaging angle of the camera 3 in a case of a long-term vibration, and performs correction by calculating the photographed image from the camera 3 in a case of a medium-term vibration.

FIG. 14 is a diagram showing internal functions and peripheral cables of the projection control apparatus 1 that performs the operation of the present embodiment. An external device control cable 17 is connected to the notification lamp 32, the light 37, and the like to control the notification lamp 32, the light 37, and the like. Control signals of the notification lamp 32 and the light 37 are acquired using the video signal of the DVI interface as in the projection control information. Therefore, the system control apparatus 4 can control the notification lamp 32 and the light 37 frame by frame. A sensor information input cable 18 transmits the output of the vibration sensor 36 to the projection control apparatus 1. A sensor information processing circuit 109 converts the output of the vibration sensor 36 input through the sensor information input cable 18 to a signal mode that can be processed by the system control apparatus 4. A sensor information output cable 19 transmits the output of the sensor information processing circuit 109 to the system control apparatus 4. If the input of the sensor information processing circuit 109 is an analog signal and the output is also an analog signal, the sensor information processing circuit 109 functions as an analog signal buffer or an amplifier. In this case, the system control apparatus 4 converts the signal to a digital signal on a built-in A/D conversion board to execute processing. If the input of the sensor information processing circuit 109 is an analog signal and the output is a digital signal, the sensor information processing circuit 109 functions as an A/D conversion circuit. In this case, the system control apparatus 4 imports the digital signal through a general-purpose port input board to execute processing.

In this way, according to the fourth embodiment, the image data used for the three dimensional measurement is appropriately selected in the three dimensional measurement for controlling the robot, and highly accurate three dimensional measurement can be attained. The control signals of other peripheral devices (the notification lamp 32 and the light 37) can be included in the video signal in addition to the projection control information and the imaging control information. The frame-by-frame control of the peripheral devices as well as the control in synchronization with the frames can be easily realized.

According to the present invention, the operation of the projection apparatus can be easily controlled frame by frame.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185252, filed Aug. 26, 2011, which is hereby incorporated by reference herein in its entirety.

What is claimed is:

1. A projection control apparatus for controlling a projection apparatus, the projection control apparatus comprising:
a receiving unit configured to receive a video signal including a plurality of color components;
an extraction unit configured to extract information of a specific color component for each frame of the video signal received by the receiving unit;
a generating unit configured to generate, frame by frame, (a) projection control information for controlling the projection apparatus and (b) control information for controlling an external apparatus other than the projection apparatus based on the information of the specific color component extracted by the extraction unit;
a providing unit configured to provide the projection control information generated by the generating unit to the projection apparatus; and
a sending unit configured to send the control information to the external apparatus.

2. The apparatus according to claim 1, wherein the extraction unit is further configured to extract information of color components other than the specific color components,
wherein the generating unit is further configured to generate a video signal to be displayed by the projection apparatus based on the information of the color components extracted by the extraction unit, and
wherein the providing unit is further configured to provide the video signal generated by the generating unit to the projection apparatus.

3. The apparatus according to claim 1, wherein the projection apparatus is configured to project a predetermined pattern according to a predetermined instruction signal, and
wherein the projection control information includes the predetermined instruction signal.

4. The apparatus according to claim 1, wherein the external apparatus is an imaging apparatus,
wherein the generating unit is configured to generate, frame by frame, imaging control information for controlling an imaging operation of the imaging apparatus based on the information of the specific color component extracted by the extraction unit, and
wherein the sending unit is configured to send the imaging control information generated by the generating unit to the imaging apparatus.

5. The apparatus according to claim 1, wherein the providing unit is configured to provide the projection control information to the projection apparatus through wireless communication.

6. The apparatus according to claim 1, wherein the projection control information includes a signal for controlling lighting of a light source included in the projection apparatus.

7. The apparatus according to claim 4, wherein the imaging control information includes a signal for controlling a shutter of the imaging apparatus.

8. The apparatus according to claim 1, further comprising a unit configured to receive status information from the projection apparatus, and
wherein the generating unit is configured to change the projection control information based on the status information.

9. A projection control method by a projection control apparatus for controlling a projection apparatus, the projection control method comprising:
receiving a video signal including a plurality of color components;
extracting information of a specific color component for each frame of the video signal received in the receiving;
generating, frame by frame, (a) projection control information for controlling the projection apparatus and (b) control information for controlling an external apparatus other than the projection apparatus based on the information of the specific color component extracted in the extracting;
providing the projection control information generated in the generating to the projection apparatus; and
sending the control information to the external apparatus.

10. A non-transitory computer-readable storage medium storing a program for causing a computer of a projection control apparatus that controls a projection apparatus to execute a method comprising:
    receiving a video signal including a plurality of color components;
    extracting information of a specific color component for each frame of the received video signal;
    generating, frame by frame, (a) projection control information for controlling the projection apparatus and (b) control information for controlling an external apparatus other than the projection apparatus based on the information of the extracted specific color component;
    providing the generated projection control information to the projection apparatus; and
    sending the generated control information to the external apparatus.

* * * * *